G. MOORE.
Construction of Plow-Irons.
No. 152,240. Patented June 23, 1874.
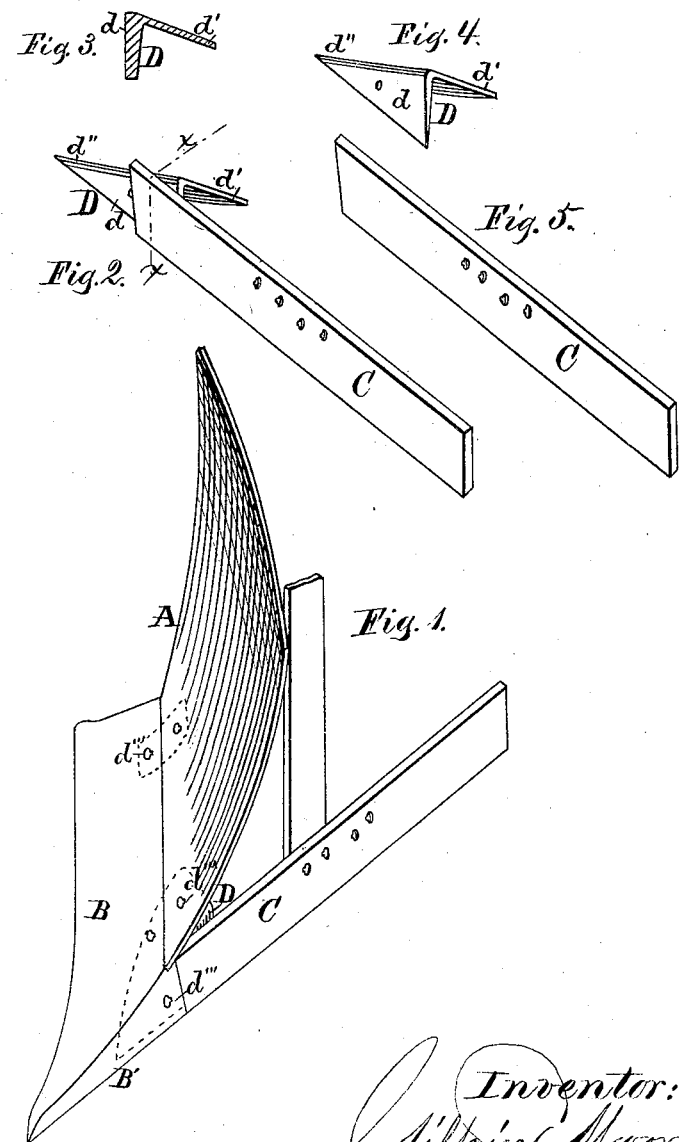

UNITED STATES PATENT OFFICE.

GILPIN MOORE, OF MOLINE, ILLINOIS.

IMPROVEMENT IN THE CONSTRUCTION OF PLOW-IRONS.

Specification forming part of Letters Patent No. 152,240, dated June 23, 1874; application filed January 6, 1874.

*To all whom it may concern:*

Be it known that I, GILPIN MOORE, of Moline, in the county of Rock Island, in the State of Illinois, have invented certain new and useful Improvements in Plows, of which the following is a specification:

The present invention relates to that class of turning-plows in which slip-shares are used, or shares which are interchangeable, and in which the land-side bar is formed in two parts—a rear part attached to and forming part of the base of the plow, and a front part attached to and forming part of the slip-share; and the invention consists in the frog or angle-plate formed of a single bent plate, so constructed as to extend forward and laterally to form a firm support for the share, and welded to the forward end of the rear land-side bar to produce an unyielding union, and in such relation thereto that the forward end of said land-side bar forms a shoulder for the rear end of the forward land-side bar or side of the slip-share to abut against, all as hereinafter fully described.

To enable others skilled in the art to understand fully the nature of my invention, and to make practical application of the same, I will proceed to explain it in detail, referring by letters to the accompanying drawing, in which—

Figure 1 is a perspective view of a plow embodying the invention; Fig. 2, a perspective view of the rear part of a double land-side with a frog attached; Fig. 3, a cross-section of Fig. 2 on the line $x\ x$; and Figs. 4 and 5, perspective views, respectively, of the frog and the rear land-side bar.

The general principles of the various styles of slip-shares and double land-side plows are too well known to require further explanation here than a mere reference to Fig. 1, which shows the ordinary share with the forward end of the land-side attached thereto, forming what is known as the slip-share, the advantages of which are well known, and the application of which to a plow necessitates a construction of the other parts adapted to receive it, as shown at said figure, where A represents an ordinary plow mold-board; B B', blade and side, respectively, of the ordinary slip-share; C, the rear land-side bar, having at its forward end a frog, D, attached thereto in such manner as to form a connecting plate and brace between the slip-share, mold-board, and rear land-side, as plainly shown at said Fig. 1.

In my invention the frog D is formed of a single plate of wrought-iron, bent, as shown in the drawing, so as to have a vertical side, $d$, and a laterally-projecting side, $d'$, and a forward-extended end or point, $d''$. The connection of the vertical side and rear end of the frog D to the inner side and forward end of the rear land-side C is made by welding the said adjacent vertical faces of the frog and land-side together in the relative positions shown plainly at Fig. 2. The said weld may be produced in any suitable press, or by any convenient practical method which will tend to unite the parts perfectly while at a welding heat, and preserve their form and relative positions, and will produce a cheaper device than is produced by the ordinary method of bolting a short frog or angle-plate to a long land-side bar, which is bent short to form a shoulder or rest for the rear end of the forward land-side bar, and projects forward to a point beneath the share as a support therefor, and a better joint, inasmuch as it will be firmer and not subject to allow the parts to give after being worn considerably, as is the case with said ordinary bolt-joint, thereby injuring very greatly the action of the plow in practical use. The slip-share B B' is placed in position, as shown at Fig. 1, and secured by bolts $d'''\ d'''$, the rear end of the bar B' resting against the forward end of the bar C, and its inner side resting against the vertical side $d$ of the frog D, the end $d''$ of the frog extending well forward beneath the slip-share to constitute a firm support, while its side $d'$ projects laterally and rests against the under side of the share-blade B.

I am aware, as hereinbefore stated, that a short frog and rear land-side have been before connected by a bolt-joint, and also that a connection by welding has been made, involving a somewhat complicated and difficult process of connecting them by a horizontal scarf-weld, while it is evident to any one at all skilled in the art that the connection made by my improved method requires no modification or change of form from a plain straight bar for the rear land-side C, and a simple face and side to the adjacent side of the frog, and that the construction of the frog is such as to form a support for the slip-share, and dispense with extra parts and difficult and expensive processes of construction, as shown in the drawings; and

What I claim as my invention is—

The frog D, constructed of one piece of iron, with vertical side $d$, lateral side $d'$, and projecting forward end $d''$, with the land-side C welded thereto, leaving its forward end as a shoulder for the side B' of the slip-share, substantially as described, and for the purpose specified.

GILPIN MOORE.

Witnesses:
S. H. VELIE,
ELSWORTH MAPES.